(12) United States Patent
Suzuki

(10) Patent No.: US 10,735,666 B2
(45) Date of Patent: Aug. 4, 2020

(54) IMAGE CAPTURING APPARATUS, LIGHT EMITTING APPARATUS, AND CONTROL METHOD THEREOF

(71) Applicant: CANON KABUSHIKI KAISHA, Tokyo (JP)

(72) Inventor: Ryuta Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/383,900

(22) Filed: Apr. 15, 2019

(65) Prior Publication Data
US 2019/0342483 A1 Nov. 7, 2019

(30) Foreign Application Priority Data
May 7, 2018 (JP) .................................. 2018-089466

(51) Int. Cl.
*H04N 5/235* (2006.01)
*G03B 15/05* (2006.01)
*H04N 5/04* (2006.01)
*G03B 15/03* (2006.01)
*H04W 4/80* (2018.01)

(52) U.S. Cl.
CPC ........... *H04N 5/2354* (2013.01); *G03B 15/03* (2013.01); *G03B 15/05* (2013.01); *H04N 5/04* (2013.01); *G03B 2215/0557* (2013.01); *H04W 4/80* (2018.02)

(58) Field of Classification Search
CPC ........ H04N 5/04; H04N 5/232; H04N 5/2354; H04W 4/80; G03B 15/03–05; G03B 2215/0557
See application file for complete search history.

(56) References Cited

U.S. PATENT DOCUMENTS

| 8,041,203 B2 * | 10/2011 | Kunishige ................ G03B 9/70 396/56 |
| 9,602,707 B2 * | 3/2017 | Clark ................... G03B 17/566 |
| 2012/0230663 A1 * | 9/2012 | Ogasawara .............. G03B 7/16 396/56 |

FOREIGN PATENT DOCUMENTS

| JP | 2010185961 A | 8/2010 |
| JP | 2016021020 A | 2/2016 |

* cited by examiner

*Primary Examiner* — Lin Ye
*Assistant Examiner* — Chriss S Yoder, III
(74) *Attorney, Agent, or Firm* — Venable LLP

(57) ABSTRACT

An image capturing apparatus comprises a communication unit that performs wireless communication with a plurality of light emitting apparatuses and a control unit that switches to a first communication state in which the plurality of light emitting apparatuses and the image capturing apparatus perform wireless communication at predetermined communication intervals, and a second communication state in which a predetermined light emitting apparatus of the plurality of light emitting apparatuses and the image capturing apparatus perform wireless communication at predetermined communication intervals and the predetermined light emitting apparatus and a light emitting apparatus other than the predetermined light emitting apparatus perform wireless communication at variable communication intervals. The control unit switches to the first communication state or the second communication state according to an operational state of the image capturing apparatus.

15 Claims, 12 Drawing Sheets

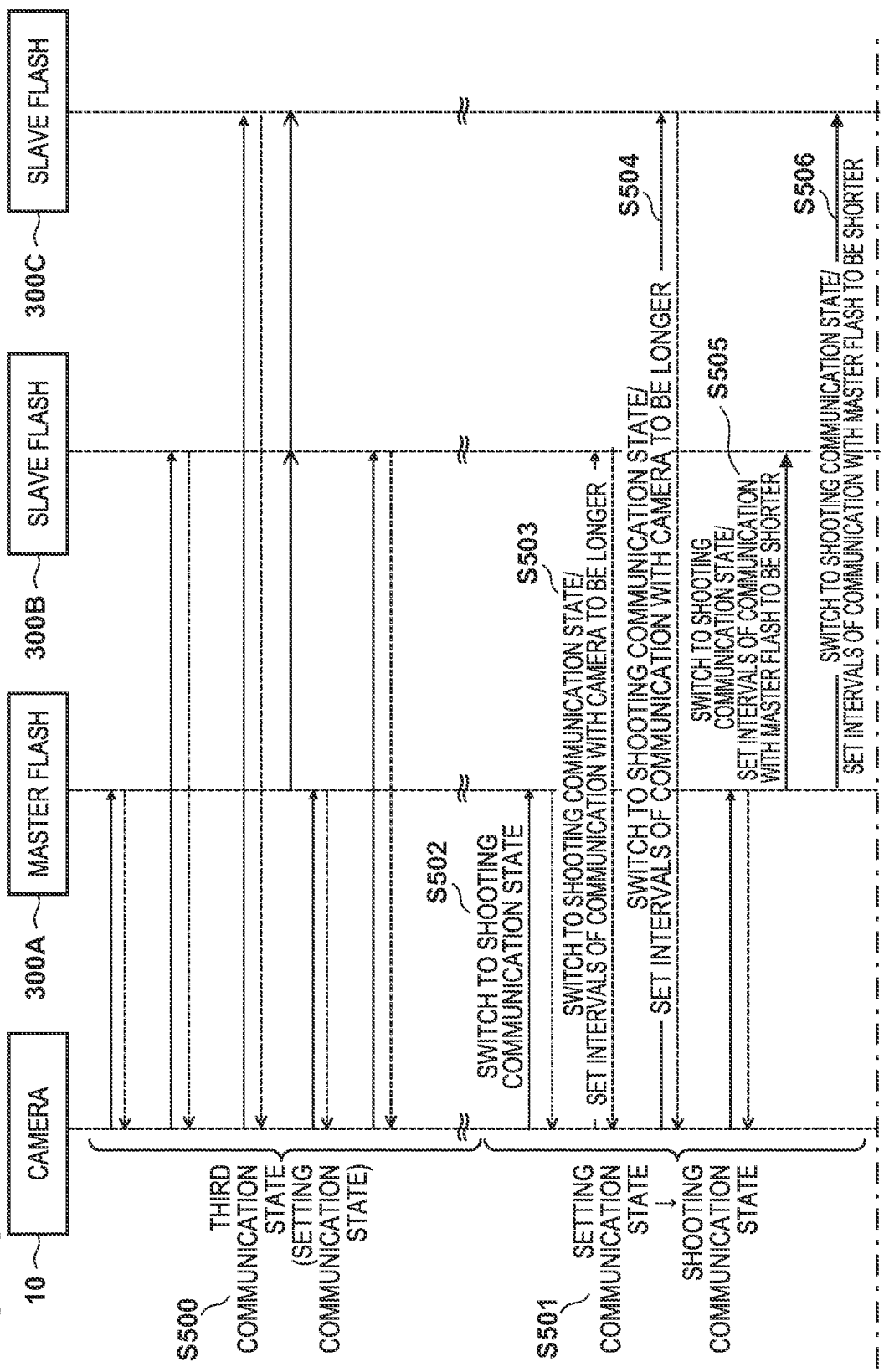

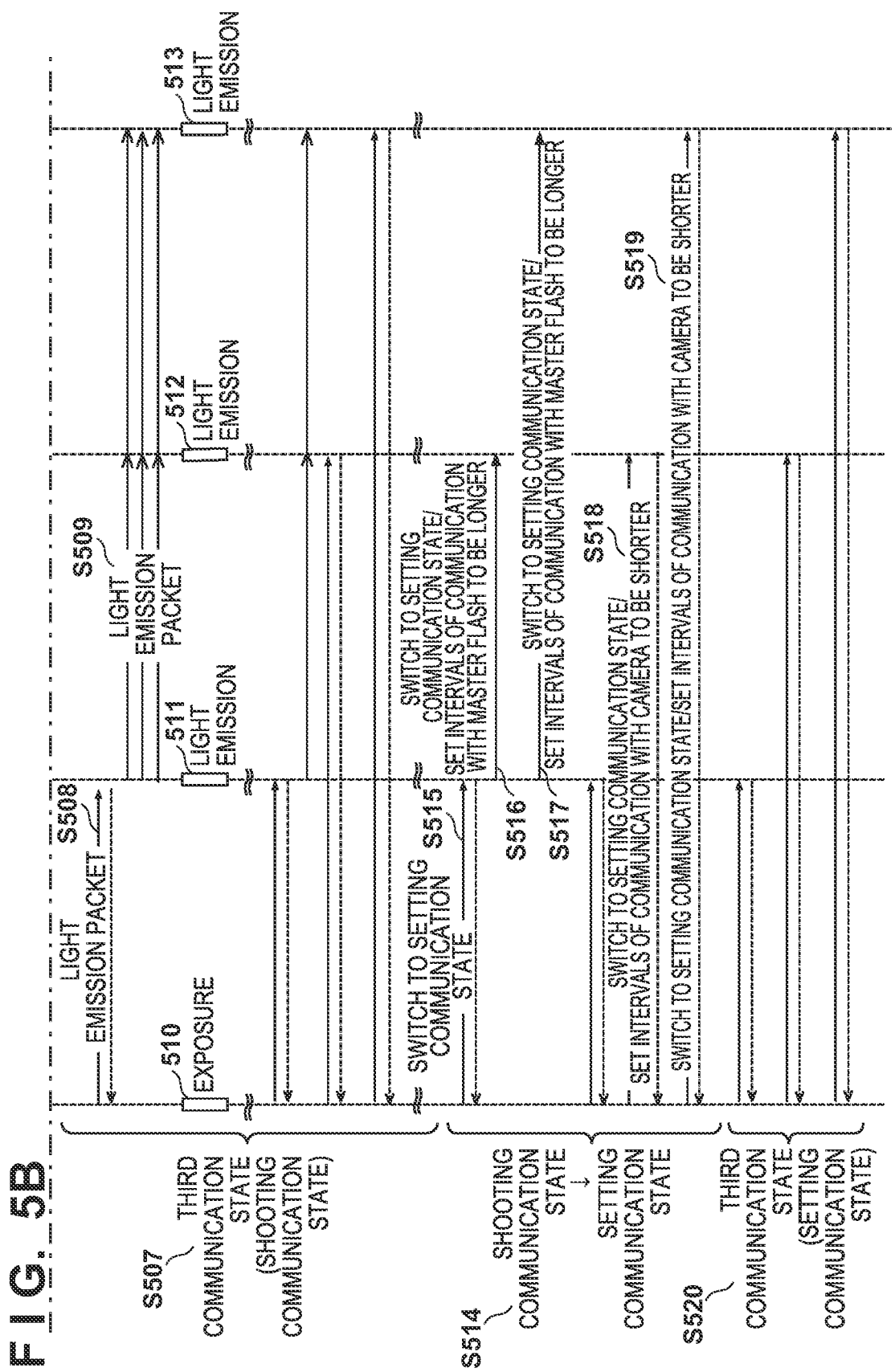

IMAGE CAPTURING APPARATUS, LIGHT EMITTING APPARATUS, AND CONTROL METHOD THEREOF

BACKGROUND OF THE INVENTION

Field of the Invention

The present invention relates to an image capturing apparatus, a light emitting apparatus, and methods for controlling them, and particularly relates to a technique that is employed by an image capturing apparatus to control, via wireless communication, light emission that is performed by a light emitting apparatus.

Description of the Related Art

In a system in which an image capturing apparatus such as a camera, and a light emitting apparatus such as a flash, are connected to each other via wireless communication, synchronization between exposure performed by the camera and light emission performed by the flash is established by the camera, transmitting light emission information, which contains information regarding the timing of light emission performed by the flash, to the flash.

Japanese Patent Laid-Open No. 2010-185961 discloses that, in order to establish synchronization between exposure performed by the camera and light emission performed by the flash, the camera transmits "a light emission signal" that includes time and an instruction, indicating that "light emission is to be started in X seconds", to the flash. Japanese Patent Laid-Open No. 2016-021020 discloses that, when the camera is to transmit a light emission signal, a communication scheme that has restrictions on its communication intervals is switched to a communication scheme for performing multi-address transmission to a plurality of flashes.

However, according to Japanese Patent Laid-Open No. 2010-185961 and Japanese Patent Laid-Open No. 2016-021020, a camera and a flash can only perform communication at predetermined intervals, and cases where a camera does not have the function of performing multi-address transmission to a plurality of flashes is not envisaged. If a failure occurs in transmission/reception of a light emission signal in a state where a camera and a plurality of flashes perform one-to-one communication at predetermined intervals, a light emission failure or a release time lag of a flash may occur.

SUMMARY OF THE INVENTION

The present invention has been made in consideration of the aforementioned problems, and realizes a system that can switch the state of communication between an image capturing apparatus and a light emitting apparatus to an appropriate state according to the operational state of the image capturing apparatus, and synchronize the timing of exposure performed by the image capturing apparatus and the timing of light emission performed by the light emitting apparatus.

In order to solve the aforementioned problems, the present invention provides an image capturing apparatus comprising: a communication unit configured to perform wireless communication with a plurality of light emitting apparatuses; and a control unit configured to switch to a first communication state in which the plurality of light emitting apparatuses and the image capturing apparatus perform wireless communication at predetermined communication intervals, and a second communication state in which a predetermined light emitting apparatus of the plurality of light emitting apparatuses and the image capturing apparatus perform wireless communication at predetermined communication intervals and the predetermined light emitting apparatus and a light emitting apparatus other than the predetermined light emitting apparatus perform wireless communication at variable communication intervals, wherein the control unit switches to the first communication state or the second communication state according to an operational state of the image capturing apparatus.

In order to solve the aforementioned problems, the present invention provides an image capturing apparatus comprising: a communication unit configured to perform wireless communication with a plurality of light emitting apparatuses; and a control unit configured to perform control to change intervals of communication between the plurality of light emitting apparatuses and the image capturing apparatus, and intervals of communication between a predetermined light emitting apparatus of the plurality of light emitting apparatuses and a light emitting apparatus other than the predetermined light emitting apparatus, according to an operational state of the image capturing apparatus.

In order to solve the aforementioned problems, the present invention provides a light emitting apparatus that is controlled by an image capturing apparatus, comprising: a communication unit configured to perform wireless communication between the image capturing apparatus and another light emitting apparatus; and a control unit configured to perform wireless communication with the image capturing apparatus at predetermined communication intervals, and switch to a first communication state in which wireless communication with the other light emitting apparatus is disconnected, and a second communication state in which wireless communication with the image capturing apparatus is performed at predetermined communication intervals, and wireless communication with the other light emitting apparatus is performed at variable communication intervals, wherein the control unit switches to the first communication state or the second communication state in response to a communication state switching request from the image capturing apparatus.

In order to solve the aforementioned problems, the present invention provides a method for controlling an image capturing apparatus that performs wireless communication with a plurality of light emitting apparatuses, the method comprising: switching to a first communication state in which the plurality of light emitting apparatuses and the image capturing apparatus perform wireless communication at predetermined communication intervals, and a second communication state in which a predetermined light emitting apparatus of the plurality of light emitting apparatuses and the image capturing apparatus perform wireless communication at predetermined communication intervals and the predetermined light emitting apparatus and a light emitting apparatus other than the predetermined light emitting apparatus perform wireless communication at variable communication intervals, wherein in the switching is performed to switch to the first communication state or the second communication state according to an operational state of the image capturing apparatus.

According to the present invention, it is possible to switch the state of communication between the image capturing apparatus and the light emitting apparatus to an appropriate state according to the operational state of the image capturing apparatus, and synchronize the timing of exposure performed by the image capturing apparatus and the timing of light emission performed by the light emitting apparatus.

Further features of the present invention will become apparent from the following description of exemplary embodiments with reference to the attached drawings.

BRIEF DESCRIPTION OF THE DRAWINGS

FIGS. 5A and 5B are sequence diagrams illustrating operations performed during flash synchronization shooting according to the second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The following describes a flash synchronization shooting system according to a first embodiment.

Figure 1A:
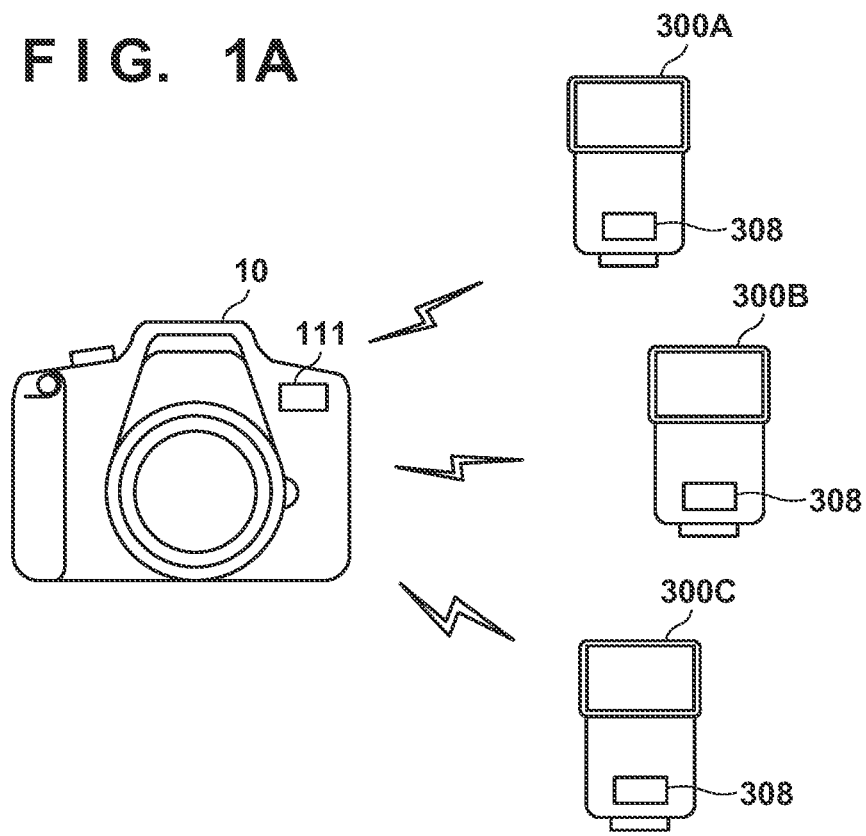
FIGS. 1A and 1B are diagrams showing examples of a flash synchronization shooting system according to a first embodiment.
Figure 1B:
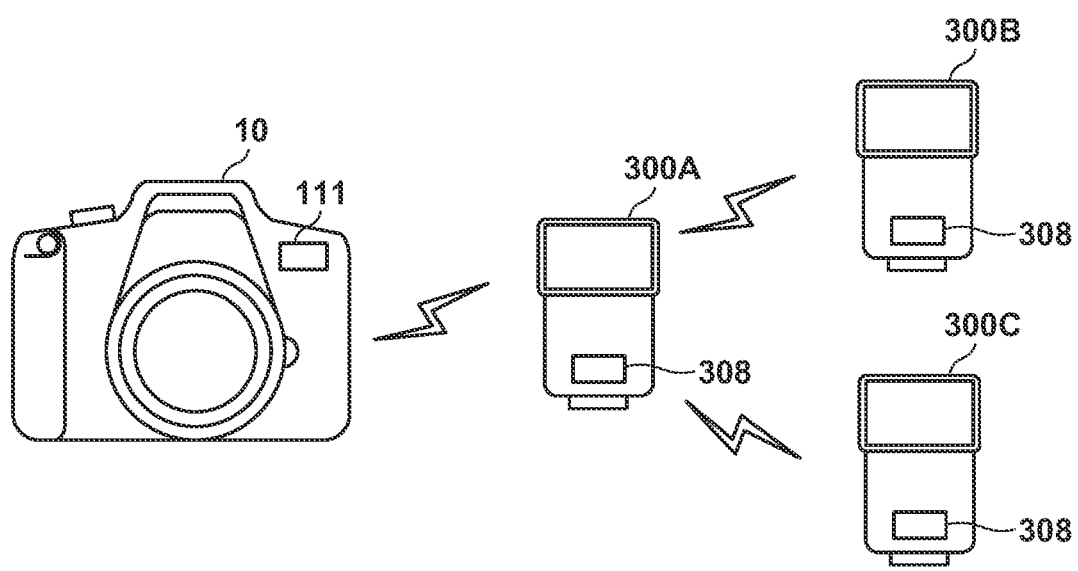

FIGS. 1A and 1B are diagrams showing examples of a flash synchronization shooting system according to the first embodiment. The flash synchronization shooting system according to the present embodiment is applicable to shooting that involves a flash that performs wireless communication with a camera. A camera 10, which is an image capturing apparatus, controls light emission that is performed by flashes 300A, 300B and 300C, which are light emitting apparatuses, via wireless communication. The wireless communication scheme employed herein is a short-range wireless communication scheme such as Bluetooth (registered trademark) or ZigBee (registered trademark). The camera 10 is a digital single-lens reflex camera, for example. Note that the present embodiment is applicable not only to shooting involving a digital camera, but also to shooting involving a flash that performs wireless communication with an electronic device such as a personal computer that has a camera function, a mobile telephone, a smart device, which is a type of a mobile telephone, or a tablet terminal. A wireless communication unit 111 is built into the camera 10. A wireless communication unit 308 is built into each of the flashes 300A to 300C.

In a system according to the present embodiment, the state of communication between the camera 10 and the flashes 300A to 300C can be switched to a first communication state shown in FIG. 1A and a second communication state shown in FIG. 1B. The first communication state is a state where the camera 10 serves as a master and the flashes 300A to 300C serve as slaves, and communication can be performed at predetermined (constant) intervals (or communication intervals longer than those in the second communication state) via the wireless communication units 111 and 308. Also, the first communication state is a state where communication between the flashes, including the flash 300A serving as a master flash (a predetermined light emitting apparatus) and the flashes 300B and 300C serving as slave flashes (light emitting apparatuses other than the predetermined light emitting apparatus), is disconnected. The second communication state is a state where the camera 10 and the master flash 300A can perform communication at predetermined (constant) communication intervals (or communication intervals shorter than those in the first communication state) via the wireless communication units 111 and 308. Also, the second communication state is a state where the master flash 300A and the slave flashes 300B and 300C can perform communication at any (variable) time via the wireless communication units 308.

Figure 2A:
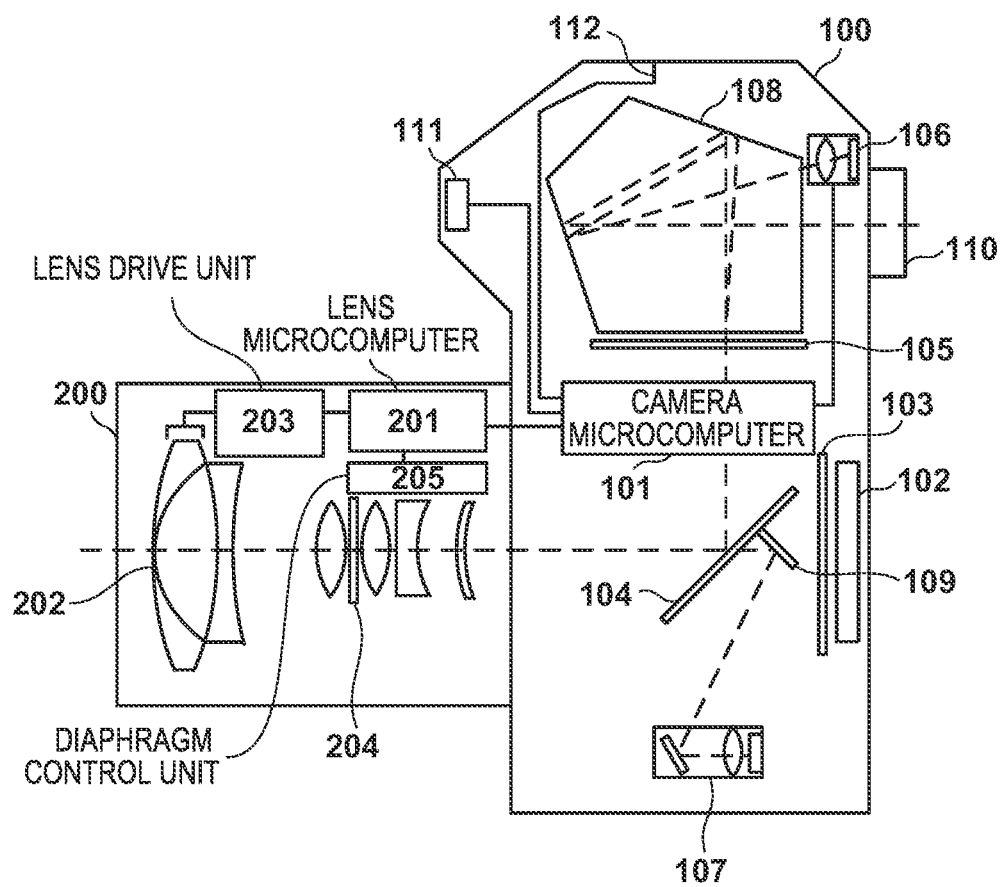
FIG. 2A is a block diagram showing an example of a configuration of a camera according to the first embodiment.

FIG. 2A is a block diagram showing a configuration of the camera 10 according to the present embodiment. The camera 10 according to the present embodiment includes a camera body 100 and a lens unit 200.

First, the following describes the configuration and the functions of the camera body 100.

In the camera body 100, a microcomputer (hereinafter referred to as a "camera microcomputer") 101 executes control programs such as firmware to control operations of each of the units included in the camera body 100.

The camera microcomputer 101 includes, for example, a CPU, a ROM, a RAM, an input/output control circuit (an I/O control circuit), a multiplexer, a timer circuit, an EEPROM, an A/D converter, and a D/A converter, and is configured as a single IC chip with a built-in microcomputer.

An image sensor 102 includes an image capturing device such as a CCD or a CMOS, which includes an infrared cut filter and a low pass filter, and a lens group 202 forms an optical image of a subject during a shooting operation.

A shutter 103 is closed during a shooting preparation operation, to block light from entering the image sensor 102, and is open during a shooting operation, to guide a light ray to the image sensor 102.

A main mirror (semitransparent mirror) 104 reflects incident light from the lens group 202 during the shooting preparation operation, and forms an image on a focusing screen 105.

An image of the subject is formed on the focusing screen 105 due to a light ray reflected off the main mirror 104.

A photometric unit 106 includes an image forming lens and a photometric sensor. A shooting area of the subject is divided into a plurality of areas, and the photometric sensor performs light metering for each of the areas. The photometric sensor detects the amount of light received from the subject's image formed on the focusing screen 105, via a pentaprism 108.

A focus detection unit 107 functions as a focus detection optical system. The focus detection unit 107 includes a secondary image forming mirror, a secondary image forming lens, a focus detection sensor, and so on. The focus detection sensor has a plurality of focus detection areas, and the focus detection areas are respectively included in the divisional areas of the photometric sensor.

Note that the camera body 100 has a recording medium such as a memory card or a hard disk (not shown), which is used to record captured images, and is built into, or is detachable from, the camera body 100.

The pentaprism 108 guides the subject's image formed on the focusing screen 105 to the photometric sensor of the photometric unit 106, and to an optical viewfinder 110.

A sub mirror 109 guides a light ray that has entered from the lens group 202 and has passed through the main mirror 104, to the focus detection sensor of the focus detection unit 107.

The optical viewfinder 110 allows a shooter looking into the optical viewfinder 110 to visually check the focus state of the subject's image.

The wireless communication unit 111 performs predetermined wireless communication with camera accessories such as a flash and a remote control, which are external apparatuses. It is envisaged that the wireless communication unit 111 is a wireless module, a functional unit provided in the camera microcomputer 101, or the like. In the present embodiment, the wireless communication unit 111 is a wireless module. The camera-side wireless module 111 is provided with an antenna for wireless communication, and realizes short-range wireless communication conforming to the IEEE 802.15 standard (Bluetooth (registered trademark)). Bluetooth (registered trademark) in the present embodiment has a communication mode called BLE (Bluetooth (registered trademark) Low Energy), which is low power consumption, but is performed at a low speed (a low speed communication mode). Note that the communication scheme is not limited to Bluetooth (registered trademark), and may be a wireless communication scheme such as ZigBee (registered trademark).

The camera body 100 also includes a camera-side interface (IF) 112, and transmits/receives data to/from the camera microcomputer 101 via the camera-side interface 112.

Upon an external apparatus such as the flashes 300A to 300C or a transmitter 400 being attached to an accessory shoe (not shown) of the camera body 100 as described below, the camera-side interface 112 is connected to flash-side interfaces 309 of the flashes 300A to 300C or a transmitter-side interface 403 of the transmitter 400. As a result, the camera microcomputer 101 can communicate with flash microcomputers 301 or a transmitter microcomputer 401.

The following describes the configuration and functions of the lens unit 200.

In the lens unit 200, a microcomputer (hereinafter referred to as a "lens microcomputer") 201 executes control programs such as firmware to control operations of each of the units included in the lens unit 200.

The lens microcomputer 201 includes, for example, a CPU, a ROM, a RAM, an input/output control circuit (an I/O control circuit), a multiplexer, a timer circuit, an EEPROM, an A/D converter, and a D/A converter, and is configured as a single IC chip with a built-in microcomputer.

The lens group 202 includes a plurality of lenses such as a zoom lens and a focus lens.

A lens drive unit 203 moves an optical system for adjusting a focal position of the lens group 202.

The lens microcomputer 201 controls a diaphragm 204, using a diaphragm control unit 205.

Note that the focal point distance of the lens group 202 may be a single focal point distance, or variable like that of a zoom lens.

Figure 2B:
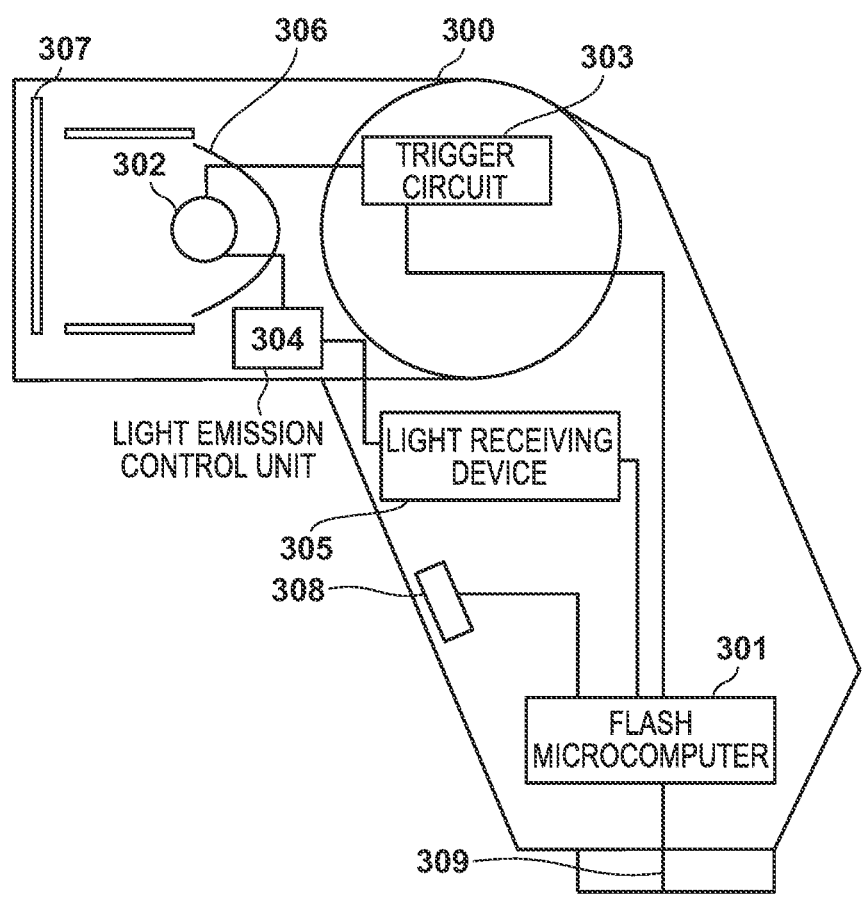
FIG. 2B is a block diagram showing an example of a configuration of a flash according to the first embodiment.

The following describes the configurations and functions of the flashes 300A to 300C with reference to FIG. 2B.

In the flashes 300A to 300C, the microcomputers (hereinafter referred to as the "flash microcomputers") 301 execute control programs such as firmware to control operations of units included in the flashes 300A to 300C.

Each flash microcomputer 301 includes, for example, a CPU, a ROM, a RAM, an input/output control circuit (an I/O control circuit), a multiplexer, a timer circuit, an EEPROM, an A/D converter, and a D/A converter, and is configured as a single IC chip with a built-in microcomputer.

A light emitting unit 302 is a xenon tube, for example, and emits light upon a pulse voltage of several kilovolts being applied from a trigger circuit 303 to a main capacitor (not shown) and xenon being excited by energy that has been charged in the main capacitor, and irradiates the subject with the light.

The trigger circuit 303 receives a trigger signal pulse output from the flash microcomputer 301 at the time of light emission.

A light emission control unit 304 controls the start and end of light emission performed by the light emitting unit 302, in conjunction with the trigger circuit 303.

A light receiving device 305 is a photodiode or the like that receives an amount of light from the light emitting unit 302, and receives light from the light emitting unit 302 directly or via an optical fiber (not shown).

A reflector 306 and a Fresnel lens 307 each efficiently collect light from the light emitting unit 302 toward the subject.

The wireless communication unit 308 performs wireless communication with the camera body 100. It is envisaged that the wireless communication unit 308 is a wireless module, a functional unit provided in the flash microcomputer 301, or the like. In the present embodiment, the wireless communication unit 308 is a wireless module. The flash-side wireless module 308 is provided with an antenna for wireless communication, and realizes short-range wireless communication conforming to the IEEE 802.15 standard (Bluetooth (registered trademark)). Bluetooth (registered trademark) in the present embodiment has a communication mode called BLE (Bluetooth (registered trademark) Low Energy), which is low power consumption, but is performed at a low speed (a low speed communication mode). Note that the communication scheme is not limited to Bluetooth (registered trademark), and may be a wireless communication scheme such as ZigBee (registered trademark).

Each of the flashes 300A to 300C includes the flash-side interface 309, and transmits/receives data to/from the flash microcomputer 301 via the flash-side interface 309. Upon any of the flashes 300A to 300C being attached to the accessory shoe (not shown) of the camera body 100, the attached flash serves as a master and the other flashes serve as slaves, and thus the flashes 300A to 300C perform wireless communication.

Upon any of the flashes 300A to 300C being attached to the accessory shoe (not shown) of the camera body 100, the flash-side interface 309 is connected to the camera-side interface 112 of the camera body 100. As a result, the flash microcomputer 301 can communicate with the camera microcomputer 101.

Figure 3A:
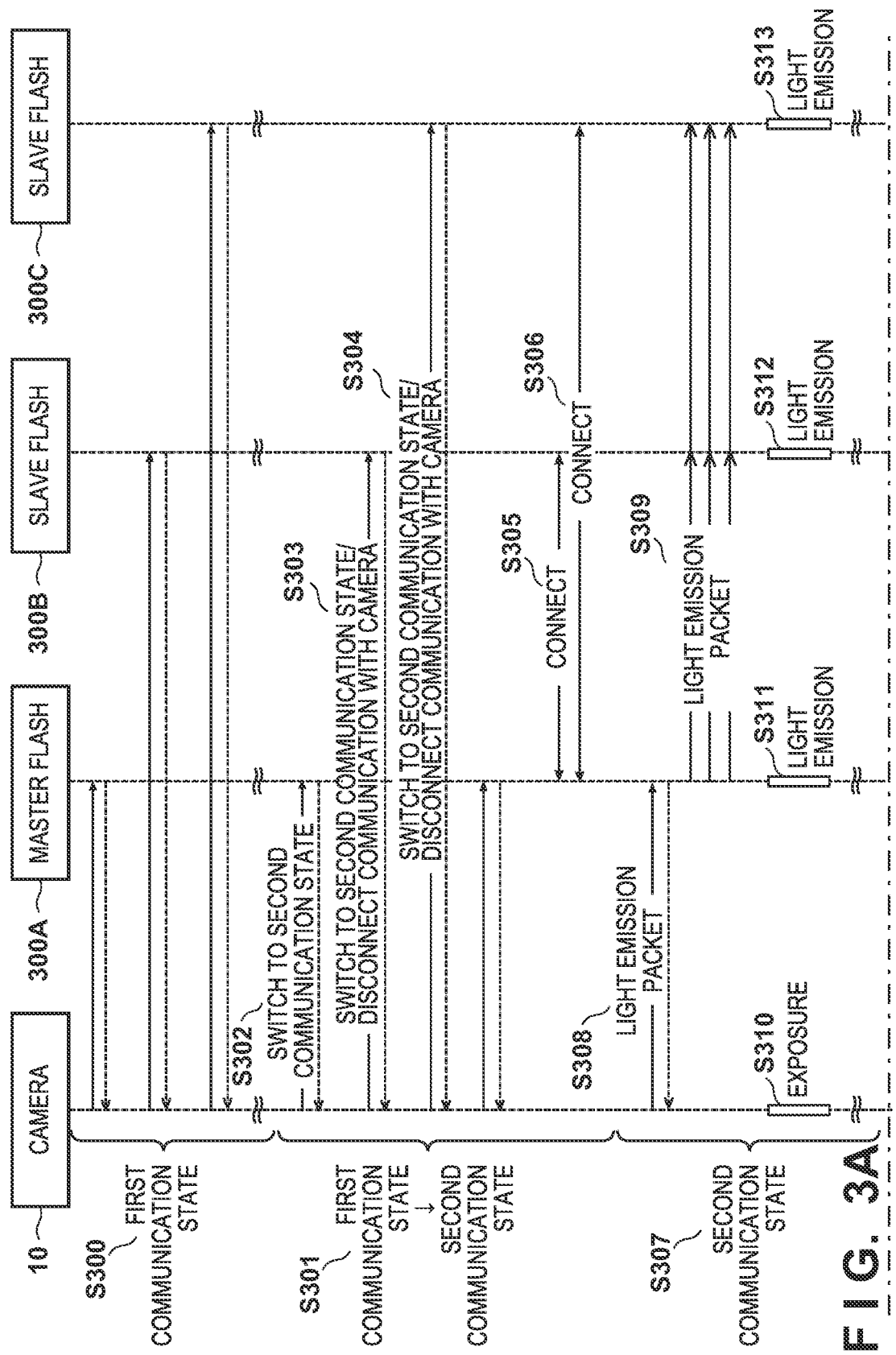
FIGS. 3A and 3B are sequence diagrams illustrating operations performed during flash synchronization shooting according to the first embodiment.
Figure 3B:
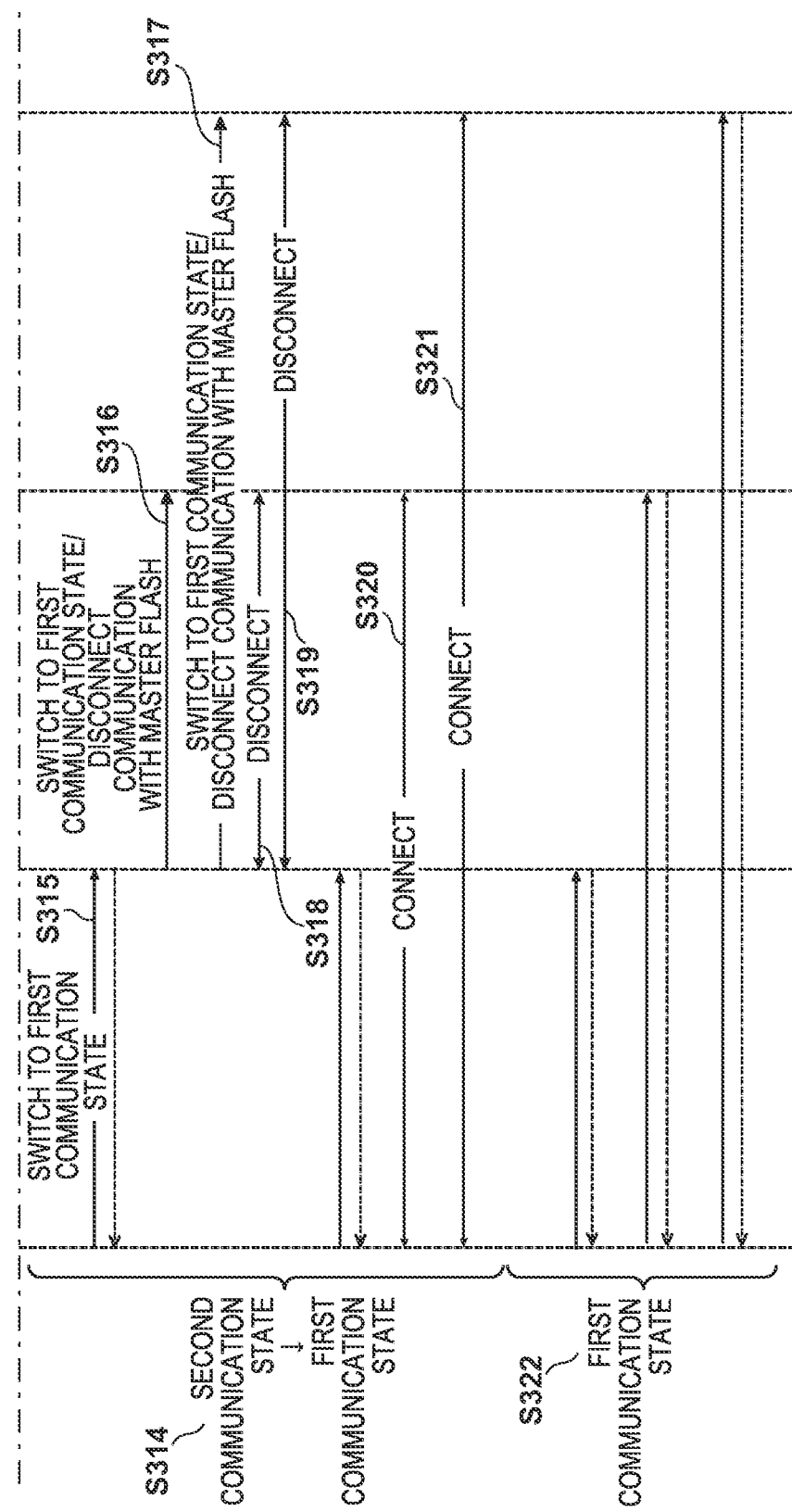

Next, with reference to FIGS. 3A and 3B, the following describes an operation sequence of flash synchronization shooting in a case where the camera 10 and the flashes 300A to 300C switch the communication state to the first communication state shown in FIG. 1A and the second communication state shown in FIG. 1B.

In the present embodiment, the camera 10 and each of the flashes 300A to 300C perform wireless communication using a first communication scheme (e.g. BLE). The master flash 300A and the slave flashes 300B and 300C perform wireless communication using a second communication scheme (e.g. ZigBee). The same applies to the second, third, and fourth embodiment described below.

First, the camera 10 and the flashes 300A to 300C perform processing to perform wireless communication and connect to each other in the first communication state.

Upon the camera 10 being powered ON, if the flash shooting mode has been set, the camera microcomputer 101 controls and sets the camera-side wireless module 111 so that the camera-side wireless module 111 can receive pieces of terminal information regarding the flashes 300A to 300C, which are communication partners. Upon the flashes 300A to 300C being powered ON, the flash microcomputer 301 controls the flash-side wireless modules 308 to set wireless frequency channels that are to be used, and transmits pieces of terminal information regarding the flashes 300A to 300C.

In step S300, upon receiving the pieces of terminal information regarding the flashes 300A to 300C, the camera 10 issues a connection request to the flashes 300A to 300C, and then the camera 10 and the flashes 300A to 300C transmit/receive apparatus information and the like to/from each other to enter the first communication state. After the camera 10 and the flashes 300A, 300B, and 300C have become able to communicate with each other in this way, the camera microcomputer 101 enters a state in which the camera microcomputer 101 waits for a shutter release operation that is performed by the shooter (a shooting standby state).

In the first communication state, for example, it is possible to apply operational settings, such as a light emission mode and the amount of light to be emitted, to the flashes 300A, 300B, and 300C, and select a master flash that is to be used in the second communication state described below, from the camera 10. The master flash may be freely determined by the user, or a flash with the highest radio field intensity may be automatically selected by the camera 10.

In step S301, processing is performed to switch the communication state from the first communication state to the second communication state. When the communication state is to be switched from the first communication state to the second communication state, the communication intervals of the camera 10 and the master flash 300A are set to be equal to, or shorter than, those in the first communication state.

Upon a shutter button (not shown) being pressed halfway down (a shooting preparation instruction), the camera microcomputer 101 generates a first signal SW1. Upon receiving the first signal SW1, the camera microcomputer 101 starts shooting preparation operations to perform AF (autofocus) processing, AE (auto exposure) processing, AWB (auto white balance) processing, EF (pre-flash emission) processing, and so on. The camera microcomputer 101 also transmits an instruction to switch to the second communication state to the flashes 300A, 300B, and 300C.

In the following description, the master flash and the slave flashes in the second communication state are the flash 300A and the flashes 300B and 300C, respectively. In step S302, the camera microcomputer 101 transmits an instruction to switch to the second communication state to the master flash 300A. In steps S303 and S304, the camera microcomputer 101 transmits an instruction to switch to the second communication state to the slave flashes 300B and 300C while keeping wireless communication with the camera 10 enabled, and disconnects wireless communication between the camera 10 and the slave flashes 300B and 300C. After disconnecting the wireless communication between the camera 10 and the slave flashes 300B and 300C, in steps S305 and S306, the master flash 300A switches connection with the slave flashes 300B and 300C to the second communication state, in which communication can be performed at any time.

In step S307, communication is performed to synchronize the timing of exposure performed by the camera 10 and the timing of light emission performed by the flashes 300A to 300C in the second communication state. If the communication state has been properly switched to the second communication state and the flashes 300A, 300B, and 300C have been fully charged, an indication of a shooting-ready state is displayed on the optical viewfinder 110 or a display unit (not shown) of the camera 10. In this shooting-ready state, upon the shutter button being fully pressed down (a shooting instruction), a second signal SW2 is generated. Upon receiving the second signal SW2, the camera microcomputer 101 starts a series of shooting operations that start with reading of image signals out of the image sensor 102 and end with writing of image data to a recording medium. In the second communication state, if the slave flashes 300B and 300C have not been fully charged, the camera 10 is notified via the master flash 300A.

In step S308, the camera microcomputer 101 transmits a light emission packet that includes information regarding the remaining time until light emission, to the master flash 300A. In step S309, after receiving the light emission packet from the camera 10, the master flash 300A transmits a light emission packet a plurality of times to the slave flashes 300B and 300C while counting down the remaining time until light emission. In steps S310 to S313, the camera microcomputer 101 starts performing exposure, and the flashes 300A, 300B, and 300C perform light emission according to the remaining time until light emission. Thus, it is possible to synchronize the timing of exposure performed by the camera 10 and the timing of light emission performed by the flashes 300A to 300C. In this way, even when the camera 10 and the flashes 300A to 300C are connected in the first communication state in which the wireless communication is performed at constant intervals, the master flash 300A performs multi-address transmission to transmit a light emission packet to the slave flashes 300B and 300C, and thus it is possible to synchronize the timing of exposure performed by the camera 10 and the timing of light emission performed by the flashes 300A to 300C.

In step S314, processing is performed to switch the communication state from the second communication state to the first communication state. When the communication state is to be switched from the second communication state to the first communication state, the communication intervals of the camera 10 and the master flash 300A are set to be equal to, or longer than, those in the second communication state.

In step S315, when the communication state is to be switched to the first communication state, the camera microcomputer 101 transmits an instruction to switch from the second communication state to the first communication state to the master flash 300A. Instances when the communication state is to be switched to the first communication state include, for example, when the operation mode of the camera 10 is switched to a mode other than the shooting mode, when a user operation has been continuously performed on the camera 10 for a predetermined period of time, when connection between the camera 10 and the master flash 300A is disconnected due to a decrease in the remaining capacity of the battery of the master flash 300A, when operational settings are applied to the slave flashes 300B and 300C from the camera 10, and so on. In steps S316 and S317, after receiving an instruction to switch to the first communication state, the master flash 300A transmits a request to switch to the first communication state to the slave flashes 300B and 300C while keeping wireless communication with the camera 10 enabled. In steps S318 and S319, after receiving the request to switch to the first communication state from the master flash 300A, the slave flashes 300B and 300C disconnect wireless communication with the master flash 300A. After the wireless communication between the master flash 300A and the slave flashes 300B and 300C is disconnected, in steps S320 and S321, the camera microcomputer 101 switches connection with the slave flashes 300B and 300C to the first communication state, in which communication can be performed at predetermined intervals.

According to the present embodiment, the state of communication between the camera 10 and the flashes 300A to 300C are switched to the first communication state or the second communication state according to the operational state of the camera 10. In the first communication state, for example, it is possible to apply operational settings, such as a light emission mode and the amount of light to be emitted, to the flashes 300A, 300B, and 300C, and select a master flash, from the camera 10. This improves usability. Also, in the second communication state, the master flash 300A mediates in the transmission of a light emission packet from the camera 10 to the slave flashes 300B and 300C, and thus performs multi-address transmission to the slave flashes 300B and 300C. In this way, it is possible to realize a system that is unlikely to cause a release time lag, a light emission failure, or the like. Note that wireless communication between the master flash and the slave flashes in the second communication state is not limited to radio wave communication, and may be optical communication.

Second Embodiment

The following describes a flash synchronization shooting system according to a second embodiment.

Figure 4:
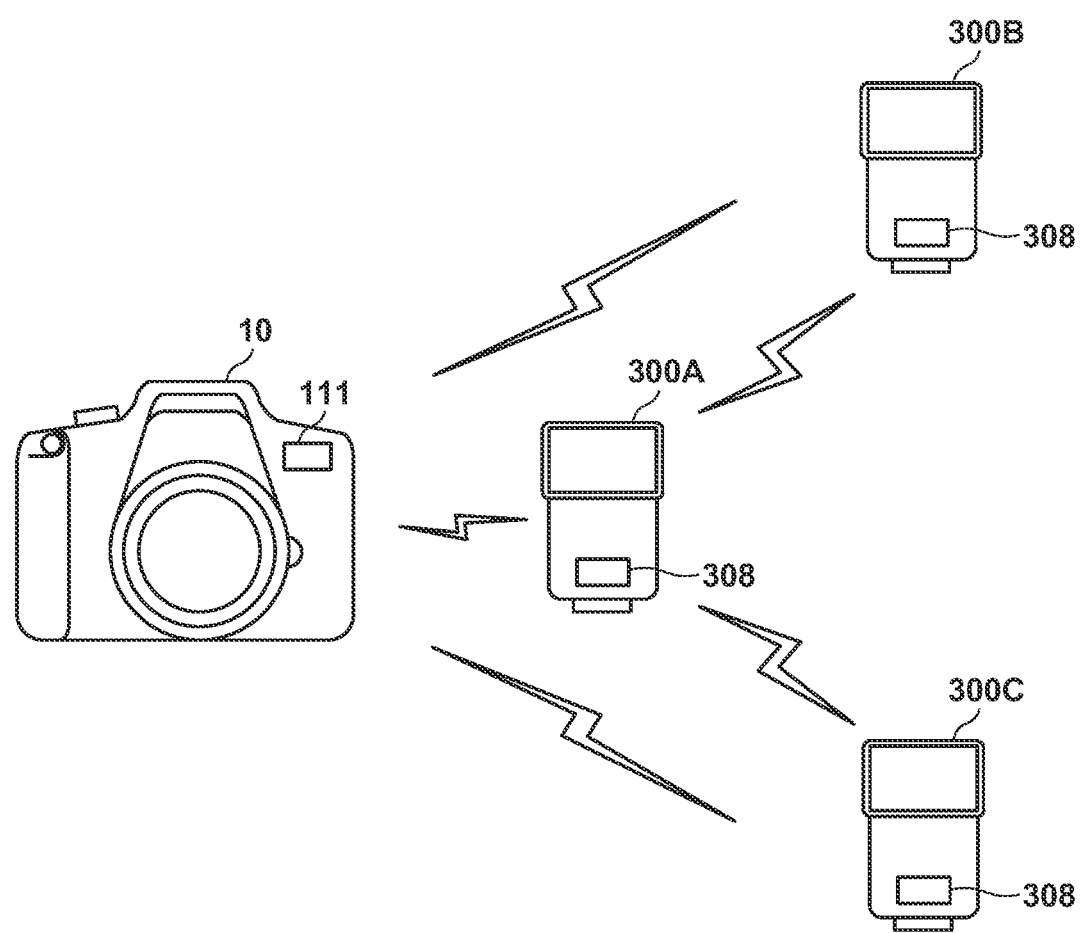
FIG. 4 is a diagram showing an example of a flash synchronization shooting system according to a second embodiment.

FIG. 4 is a diagram showing an example of a flash synchronization shooting system according to a second embodiment. In the system according to the present embodiment, the camera 10 and the flashes 300A, 300B, and 300C can connect to each other in a third communication state. In the third communication state, the camera 10 and the flashes 300A to 300C, the camera 10 and the master flash 300A, or the master flash 300A and the slave flashes 300B and 300C are in a state where communication can be performed at predetermined (constant) communication intervals. Also, in the third communication state, the intervals of communication between the camera 10 and the flashes 300A to 300C, the camera 10 and the master flash 300A, or the master flash 300A and the slave flashes 300B and 300C are changed according to the operational state of the camera 10, for example.

Next, with reference to FIGS. 5A to 7, the following describes an operation sequence of flash synchronization shooting in a case where the camera 10 and the flashes 300A to 300C perform communication in the third communication state.

First, the camera 10 and the flashes 300A, 300B, and 300C perform wireless communication, and perform processing to connect to each other in the third communication state. Such connection processing is the same as that in the first communication state described in the first embodiment, and therefore a description thereof is omitted.

Upon connection in the third communication state being complete and the camera 10 selecting the master flash 300A, the flash 300A and the slave flashes 300B and 300C enter a state in which communication can be performed at any time.

In step S500, immediately after connection is established in the third communication state, the communication state is the communication state at setting (hereinafter referred to a setting communication state) (a first state) in which the camera 10 mainly applies settings to the flashes 300A, 300B, and 300C. In the setting communication state, the camera 10 and the flashes 300A, 300B, and 300C frequently perform wireless communication. Therefore, setting communication intervals (first communication intervals) that are shorter than shooting communication intervals described below (third communication intervals) are set (i.e. a higher communication frequency is set). Wireless communication between the master flash 300A and the slave flashes 300B and 300C is mainly performed during shooting. Therefore, in the setting communication state, the intervals of communication between the master flash 300A and the slave flashes 300B and 300C are set to setting communication intervals (second communication intervals) that are longer than the shooting communication intervals described below (fourth communication intervals) (i.e. a lower communication frequency is set). The master flash 300A and the slave flashes 300B and 300C perform communication at given communication intervals to confirm the presence of each other. In this case, each time a master flash is selected, wireless communication between the master flash and the slave flashes is disconnected/connected. Other kinds of communication processing performed in this case are the same as those performed in the first communication state described in the first embodiment.

In step S501, processing is performed to switch the communication state from the setting communication state to the communication state at shooting (hereinafter referred to a shooting communication state). When the communication state is switched from the setting communication state to the shooting communication state, the intervals of communication between the camera 10 and the flashes 300A to 300C are set to be longer than those in the setting communication state. Also, in the shooting communication state, the intervals of communication between the camera 10 and the slave flashes 300B and 300C are set to be longer than the intervals of communication between the camera 10 and the master flash 300A.

In step S502, the camera microcomputer 101 transmits an instruction to switch to the third communication intervals to the master flash 300A. In steps S503 and S504, the camera microcomputer 101 transmits an instruction to switch to the third communication intervals to the slave flashes 300B and 300C to set the intervals of communication between the camera 10 and the slave flashes 300B and 300C to be longer than the first communication intervals (set a lower communication frequency). Thereafter, in steps S505 and S506, the master flash 300A transmits a request to switch to the fourth communication intervals to the slave flashes 300B and 300C to set communication intervals shorter than the second communication intervals (set a higher communication frequency). In this way, the communication state is switched from the setting communication state (the first state) to the shooting communication state (the second state).

In the shooting communication state, the camera microcomputer 101 is in a state in which the camera microcomputer 101 waits for a shutter release operation that is performed by the shooter (the shooting standby state). Therefore, compared to wireless communication between the camera 10 and the flashes 300A to 300C, the master flash 300A and the slave flashes 300B and 300C more frequently perform wireless communication. In step S507 (steps S508 to S513), as in steps S307 (steps S308 to S313), communication is performed to establish synchronization between the timing of exposure performed by the camera 10 and the timing of light emission performed by the flashes 300A, 300B, and 300C.

In step S514, processing is performed to switch the communication state from the shooting communication state to the setting communication state. When the communication state is switched from the shooting communication state to the setting communication state, the intervals of communication between the camera 10 and the flashes 300A to 300C are set to be shorter than those in the shooting communication state. Also, in the setting communication state, the intervals of communication between the camera 10 and the slave flashes 300B and 300C are set to be the same as the intervals of communication between the camera 10 and the master flash 300A.

In step S515, when the communication state is to be switched to the setting communication state, the camera microcomputer 101 transmits an instruction to switch from the shooting communication state to the setting communication state to the master flash 300A. Instances when the communication state is to be switched to the setting communication state include, for example, when the operation mode of the camera 10 is switched to a mode other than the shooting mode, when a user operation has been continuously performed on the camera 10 for a predetermined period of time, when connection between the camera 10 and the master flash 300A is disconnected due to a dead battery of the master flash 300A, when operational settings are applied to the slave flashes 300B and 300C from the camera 10, and so on. In steps S516 and S517, after receiving an instruction to switch to the setting communication state from the camera 10, the master flash 300A transmits a request to switch to the second communication intervals to the slave flashes 300B and 300C, and sets longer intervals of communication between the master flash 300A and the slave flashes 300B and 300C (set a lower communication frequency). In steps S518 and S519, the camera microcomputer 101 transmits an instruction to switch to the first communication intervals to the slave flashes 300B and 300C to set the intervals of communication between the camera 10 and the slave flashes 300B and 300C to be shorter (set a higher communication frequency).

Figure 6:
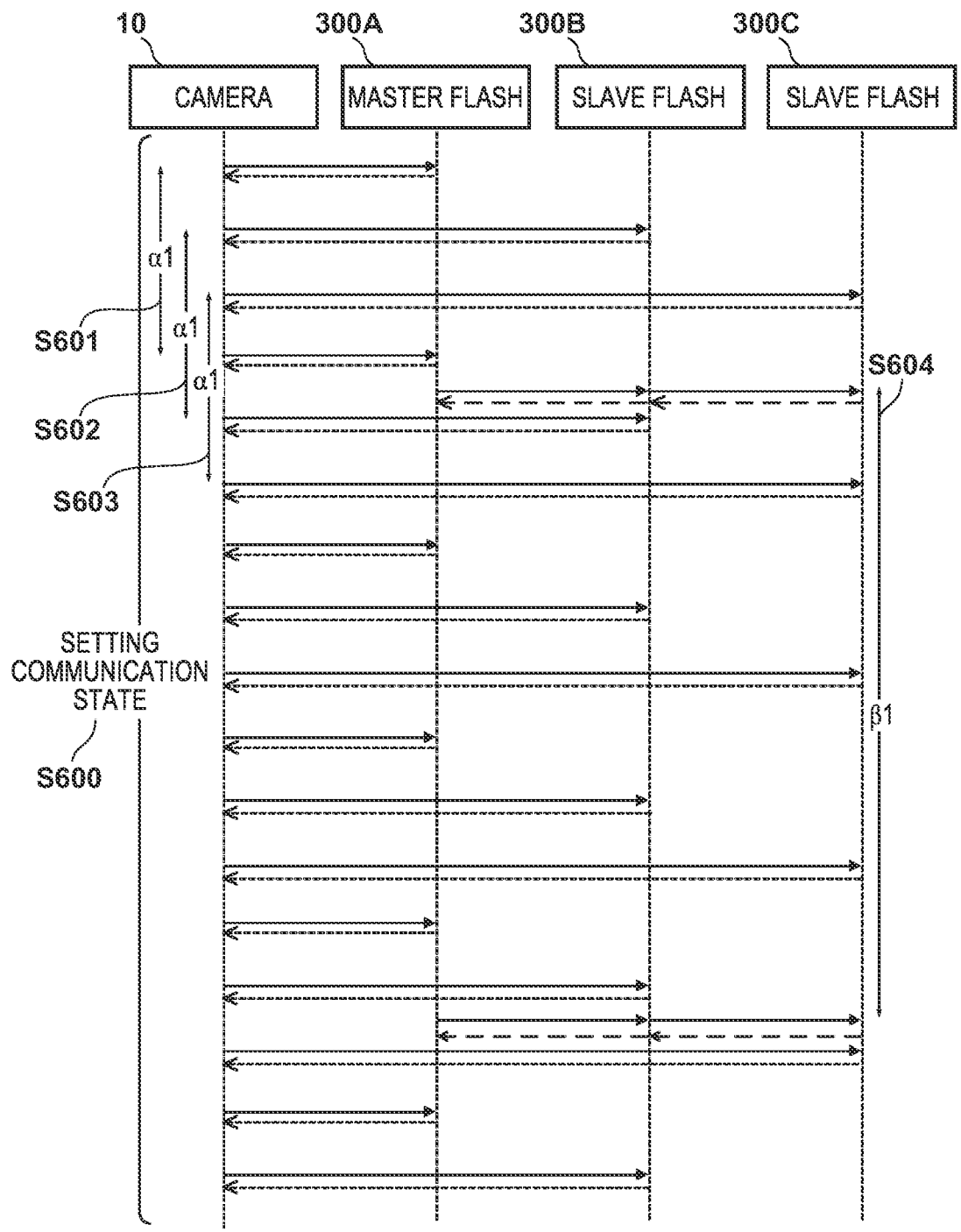
FIG. 6 is a sequence diagram illustrating communication intervals in a communication state at setting according to the second embodiment.
Figure 7:
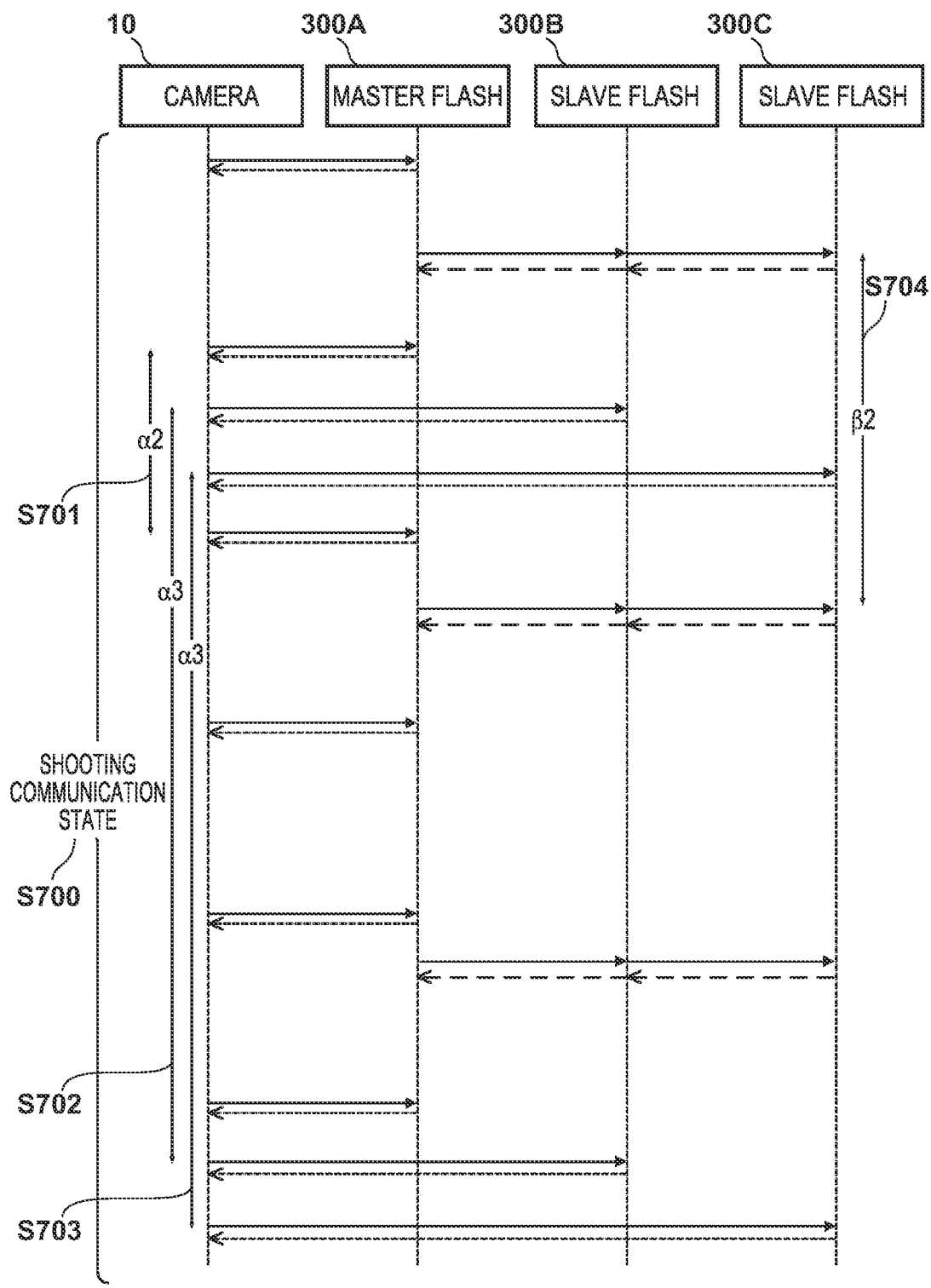
FIG. 7 is a sequence diagram illustrating communication intervals in a communication state at shooting according to the second embodiment.

Next, with reference to FIGS. 6 and 7, the following describes the intervals of communication between the camera 10 and the flashes 300A to 300C in the setting communication state and the shooting communication state in the third communication state.

In the setting communication state in step S600 of FIG. 6, the camera 10 and the flashes 300A to 300C each perform communication at first communication intervals $\alpha 1$ (steps S601 to S603). The master flash 300A and the slave flashes 300B and 300C perform communication at second communication intervals $\beta 1$ ($>\alpha 1$) (Step S604).

In the shooting communication state in step S700 of FIG. 7, the camera 10 and the master flash 300A perform communication at third communication intervals $\alpha 2$ (Step S701). The camera 10 and the slave flashes 300B and 300C perform communication at communication intervals $\alpha 3$ ($>\alpha 2$) longer than the third communication intervals $\alpha 2$ (Steps S702 and S703). The master flash 300A and the slave flashes 300B and 300C perform communication at fourth communication intervals $\beta 2$ ($<\beta 1$) (Step S704).

In such a case, the communication intervals $\alpha 1$, $\alpha 2$, and $\alpha 3$ of communication between the camera 10 and the flashes 300A, 300B, and 300C and communication intervals $\beta 1$ and $\beta 2$ of communication between the master flash 300A and the slave flashes 300B and 300C have the following relationships.

$$\alpha 1 \le \alpha 2 \le \alpha 3 \qquad \text{Expression 1:}$$

$$\beta 1 \ge \beta 2 \qquad \text{Expression 2:}$$

When the relationships represented by Expressions 1 and 2 are satisfied, in the setting communication state, wireless communication between the camera 10 and the flashes 300A to 300C is preferentially performed. Thus, it is possible to improve usability. Also, in the shooting communication state, wireless communication between the master flash 300A and the slave flashes 300B and 300C is preferentially performed. Thus, it is possible to establish synchronization between the timing of exposure performed by the camera 10 and the timing of light emission performed by the flashes 300A to 300C.

According to the present embodiment, in the third communication state, intervals of communication between the camera 10 and the flashes 300A, 300B, and 300C, or communication between the master flash 300A and the slave flashes 300B and 300C, are changed while the communication is kept connected (without being disconnected). As a result, it is possible to quickly switch the communication state, improve usability, suppress power consumption and radio wave interference, and make a release time lag and a light emission failure unlikely to occur. Note that, if usability, a release time lag, a light emission failure, and the like have only a small influence, communication intervals may not be changed so as to be different in the setting communication state and in the shooting communication state.

Third Embodiment

The following describes a flash synchronization shooting system according to a third embodiment.

Figure 8A:
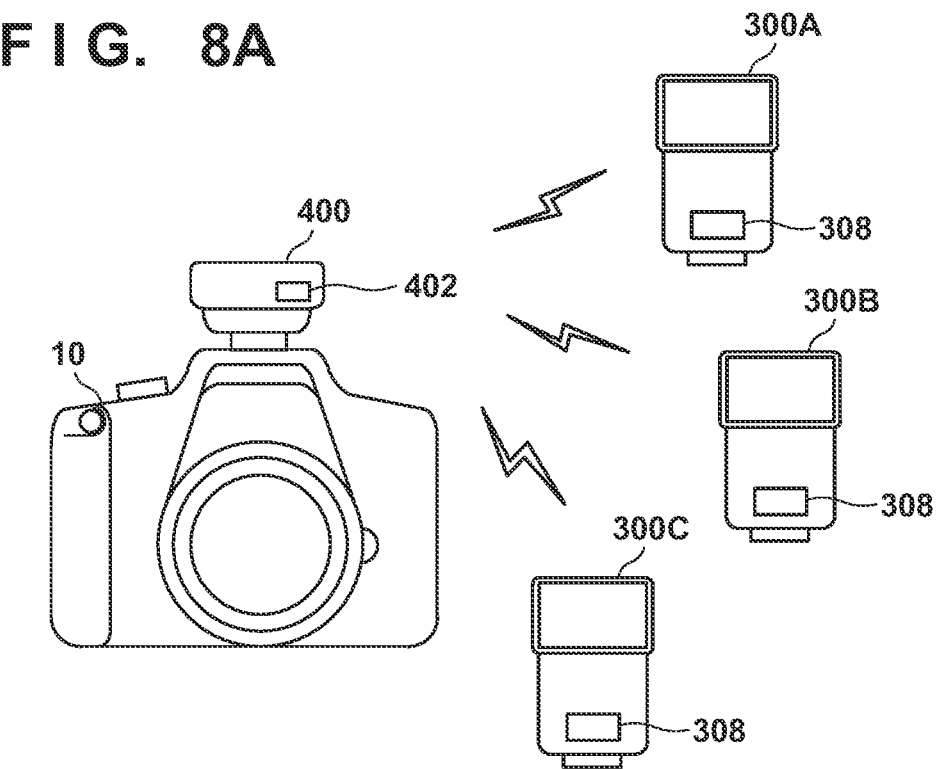
FIGS. 8A and 8B are diagrams showing examples of a flash synchronization shooting system according to a third embodiment.
Figure 8B:
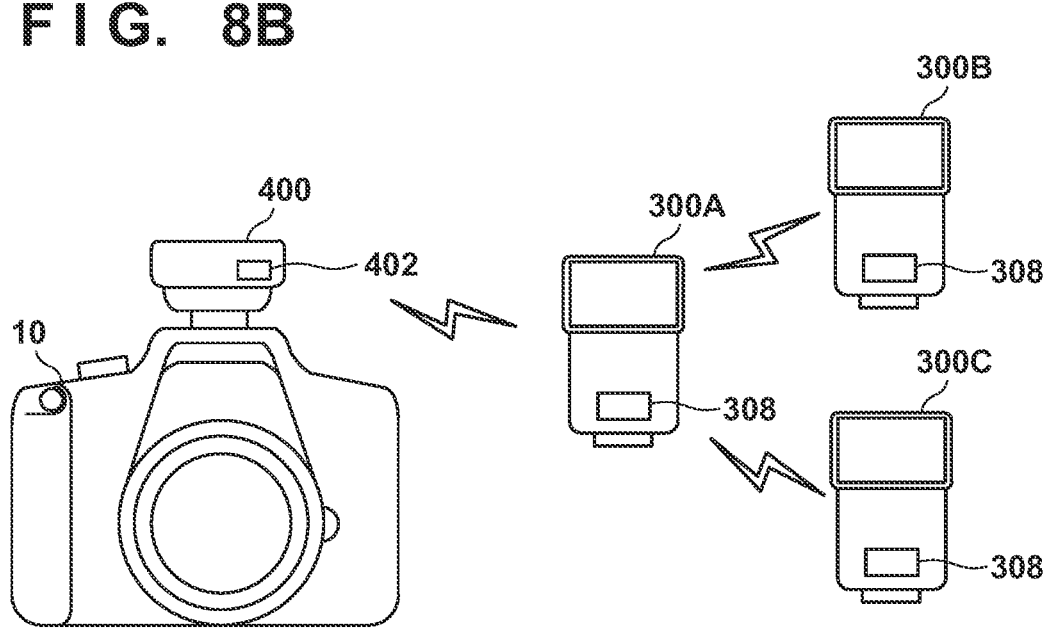

FIGS. 8A and 8B are diagrams showing examples of a flash synchronization shooting system according to the third embodiment. The transmitter 400 can be attached to the accessory shoe (not shown) of the camera body 100. The transmitter 400 includes a wireless communication unit 402. The configurations of the flashes 300A to 300C are the same as the configuration shown in FIG. 2A according to the first embodiment.

In the present embodiment, the communication state of the transmitter 400 and the flashes 300A to 300C can be switched to the first communication state shown in FIG. 8A and the second communication state shown in FIG. 8B. The first communication state shown in FIG. 8A and the second communication state shown in FIG. 8B are the same as the first communication state and the second communication state described in the first embodiment. The transmitter 400 and the flashes 300A to 300C can also perform communication in the third communication state described in the second embodiment.

In this way, if the camera 10 is not equipped with the wireless communication module 111, it is possible to realize the first and the second communication states described in the first embodiment and the third communication state described in the second embodiment by attaching the transmitter 400 to the camera 10.

Figure 9:
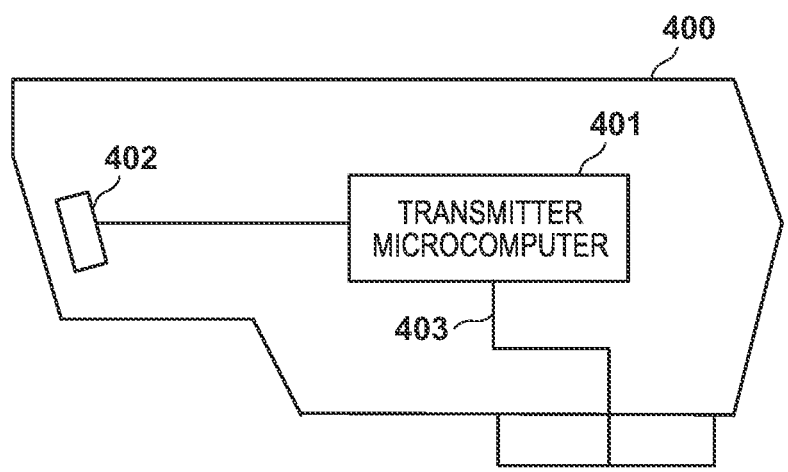
FIG. 9 is a diagram showing a configuration of a transmitter according to the third embodiment.

The following describes the configuration and functions of the transmitter 400 with reference to FIG. 9.

In the transmitter 400, a microcomputer (hereinafter referred to as a "transmitter microcomputer") 401 executes control programs such as firmware to control operations of each of the units included in the transmitter 400.

The transmitter microcomputer 401 includes, for example, a CPU, a ROM, a RAM, an input/output control circuit (an I/O control circuit), a multiplexer, a timer circuit, an EEPROM, an A/D converter, and a D/A converter, and is configured as a single IC chip with a built-in microcomputer.

The wireless communication unit 402 performs wireless communication with the flashes 300A to 300C. It is envisaged that the wireless communication unit 402 is a functional unit provided in the transmitter 400, or the like. In the present embodiment, the wireless communication unit 402 is a wireless module. The transmitter-side wireless module 402 is provided with an antenna for wireless communication, and realizes short-range wireless communication conforming to the IEEE 802.15 standard (Bluetooth (registered trademark)). Bluetooth (registered trademark) in the present embodiment has a communication mode called BLE (Bluetooth (registered trademark) Low Energy), which is low power consumption, but is performed at a low speed (a low speed communication mode). Note that the communication scheme is not limited to Bluetooth (registered trademark), and may be a wireless communication scheme such as ZigBee (registered trademark).

The transmitter-side wireless module 402 also includes the transmitter-side interface 403, and transmits/receives data to/from the transmitter microcomputer 401 via the transmitter-side interface 403.

Upon the transmitter 400 being attached to the accessory shoe (not shown) of the camera body 100, the transmitter-side interface 403 is connected to the camera-side interface 112. As a result, the transmitter microcomputer 401 can communicate with the camera microcomputer 101.

Note that the operation sequence of the transmitter 400 attached to the camera body 100 and the flashes 300A to 300C is the same as that shown in FIGS. 3A and 3B according to the first embodiment and that shown in FIGS. 5A and 5B according to the second embodiment.

The third embodiment is different from the first and second embodiments in that the camera 10 and the flashes 300A to 300C perform wireless communication via the transmitter 400, and the transmitter-side wireless module 402 is used instead of the camera-side wireless module 111.

According to the present embodiment, even when the external transmitter's wireless module 402 is used instead of the camera-side wireless module 111, the same advantageous effects as in the first and second embodiments can be achieved. Note that wireless communication between the master flash and the slave flashes in the second communication state described in the first embodiment and the third communication state described in the second embodiment is not limited to radio wave communication, and may be optical communication. Also, if each of the flashes 300A to 300C includes a transmitter 400, the transmitter 400 of the camera 10 and the transmitters 400 of the flashes 300A to 300C may perform communication. Also, the transmitter 400 of the master flash 300A and the transmitters 400 of the slave flashes 300B and 300C may perform communication.

Fourth Embodiment

The following describes a flash synchronization shooting system according to a fourth embodiment.

Figure 10:
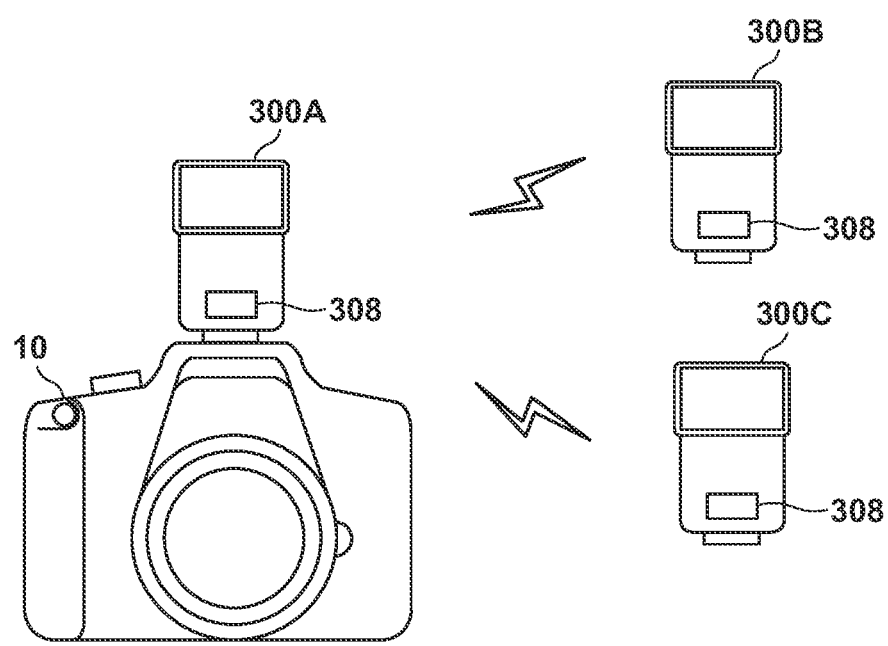
FIG. 10 is a diagram showing an example of a flash synchronization shooting system according to a fourth embodiment.

FIG. 10 is a diagram showing an example of a flash synchronization shooting system according to the fourth embodiment. The master flash 300A can be attached to the accessory shoe (not shown) of the camera body 100. Even when the camera 10 and the master flash 300A perform wired communication via the accessory shoe, the camera 10 and the flashes 300A to 300C or the master flash 300A and the slave flashes 300B and 300C can perform communication in the first communication state or the second communication state described in the first embodiment or the third communication state described in the second embodiment. If the camera 10 includes the camera-side wireless module 111, the camera 10 performs wireless communication with the slave flashes 300B and 300C, and if the camera 10 does not include camera-side wireless module 111, the master flash 300A performs the functions of the transmitter 400 described in the third embodiment.

Note that the operation sequence of the master flash 300A attached to the camera 10 and the slave flashes 300B and 300C is the same as that shown in FIGS. 3A and 3B according to the first embodiment and that shown in FIGS. 5A and 5B according to the second embodiment.

The fourth embodiment is different from the first and second embodiments in that communication between the camera 10 and the master flash 300A is wired communication instead of wireless communication, and the camera 10 performs wireless communication with the slave flashes 300B and 300C via the master flash 300A.

According to the present embodiment, if the camera 10 includes the camera-side wireless module 111, the camera 10 performs wireless communication with the slave flashes 300B and 300C. If the camera 10 does not include the camera-side wireless module 111, the camera 10 and the master flash 300A perform wired communication, and the camera 10 performs wireless communication with the slave flashes 300B and 300C via the master flash 300A. The camera 10 and the flashes 300A, 300B, and 300C can perform communication in the first and second communication state described in the first embodiment and the third communication state described in the second embodiment. In this way, the master flash 300A is attached to the camera 10, and wireless communication between the camera 10 and the slave flashes 300B and 300C is performed using the master flash 300A instead of the camera-side wireless module 111. Thus, the same advantageous effects as in the first second embodiments can be achieved. Note that wireless communication between the master flash and the slave flashes in the second communication state is not limited to radio wave communication, and may be optical communication.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-089466, filed May 7, 2018 which is hereby incorporated by reference herein in its entirety.

What is claimed is:

1. An image capturing apparatus comprising:
   a communication unit configured to perform wireless communication with a plurality of light emitting apparatuses; and
   a control unit configured to switch to a first communication state in which the plurality of light emitting apparatuses and the image capturing apparatus perform wireless communication at predetermined communication intervals, and a second communication state in which a predetermined light emitting apparatus of the plurality of light emitting apparatuses and the image capturing apparatus perform wireless communication at predetermined communication intervals and the predetermined light emitting apparatus and a light emitting apparatus other than the predetermined light emitting apparatus perform wireless communication at variable communication intervals,
   wherein the control unit switches to the first communication state or the second communication state according to an operational state of the image capturing apparatus.

2. The apparatus according to claim 1, wherein
when switching from the first communication state to the second communication state, the control unit performs control to keep wireless communication between the predetermined light emitting apparatus and the image capturing apparatus enabled, and disconnect wireless communication between the other light emitting apparatus and the image capturing apparatus.

3. The apparatus according to claim 1, wherein
when switching from the second communication state to the first communication state, the control unit performs control to keep wireless communication between the predetermined light emitting apparatus and the image capturing apparatus enabled, and disconnect wireless communication between the predetermined light emitting apparatus and the other light emitting apparatus.

4. The apparatus according to claim 1, wherein
in the first communication state, wireless communication is performed by the image capturing apparatus to apply operational settings to the plurality of light emitting apparatuses, and
in the second communication state, wireless communication is performed to establish synchronization between operations of the image capturing apparatus and operations of the plurality of light emitting apparatuses.

5. The apparatus according to claim 1, wherein
the control unit switches to the first communication state or the second communication state in response to a user operation.

6. The apparatus according to claim 5, wherein
the control unit switches to the second communication state upon receiving, in the first communication state, a user operation that instructs to perform a shooting preparation operation.

7. The apparatus according to claim 6, wherein
the control unit switches to the first communication state when a user operation has not been detected for a predetermined continuous period of time in the second communication state or when the remaining capacity of a battery of the predetermined light emitting apparatus has decreased.

8. The apparatus according to claim 1, wherein
the communication unit is attachable to the image capturing apparatus.

9. The apparatus according to claim 1, wherein
the predetermined light emitting apparatus that can perform wireless communication with the other light emitting apparatus is attachable to the image capturing apparatus, and
if the image capturing apparatus does not include the communication unit, the predetermined light emitting apparatus and the image capturing apparatus perform wired communication.

10. An image capturing apparatus comprising:
    a communication unit configured to perform wireless communication with a plurality of light emitting apparatuses; and
    a control unit configured to perform control to change intervals of communication between the plurality of light emitting apparatuses and the image capturing apparatus, and intervals of communication between a predetermined light emitting apparatus of the plurality of light emitting apparatuses and a light emitting apparatus other than the predetermined light emitting apparatus, according to an operational state of the image capturing apparatus.

11. The apparatus according to claim 10, wherein
the control unit performs control to change intervals of communication between the predetermined light emitting apparatus and the image capturing apparatus.

12. The apparatus according to claim 11, wherein
in a first state in which communication is performed by the image capturing apparatus to apply operational settings to the plurality of light emitting apparatuses, the control unit sets the intervals of communication between the plurality of light emitting apparatuses and the image capturing apparatus to be predetermined first communication intervals, and sets the intervals of communication between the predetermined light emitting apparatus and the other light emitting apparatus to be predetermined second communication intervals, and in a second state in which communication is performed to establish synchronization between operations of the image capturing apparatus and operations of the plurality of light emitting apparatuses, the control unit sets the intervals of communication between the plurality of light emitting apparatuses and the image capturing apparatus to be longer than the first communication intervals, and sets the intervals of communication between the predetermined light emitting apparatus and the other light emitting apparatus to be shorter than the second communication intervals.

13. The apparatus according to claim 12, wherein in the first state, the control unit sets the intervals of communication between the predetermined light emitting apparatus and the image capturing apparatus to be the first communication intervals, and in the second state, the control unit sets the intervals of communication between the other light emitting apparatus and the image capturing apparatus to be longer than the intervals of communication between the predetermined light emitting apparatus and the image capturing apparatus.

14. A light emitting apparatus that is controlled by an image capturing apparatus, comprising:

a communication unit configured to perform wireless communication between the image capturing apparatus and another light emitting apparatus; and a control unit configured to perform wireless communication with the image capturing apparatus at predetermined communication intervals, and switch to a first communication state in which wireless communication with the other light emitting apparatus is disconnected, and a second communication state in which wireless communication with the image capturing apparatus is performed at predetermined communication intervals, and wireless communication with the other light emitting apparatus is performed at variable communication intervals, wherein the control unit switches to the first communication state or the second communication state in response to a communication state switching request from the image capturing apparatus.

15. A method for controlling an image capturing apparatus that performs wireless communication with a plurality of light emitting apparatuses, the method comprising:

switching to a first communication state in which the plurality of light emitting apparatuses and the image capturing apparatus perform wireless communication at predetermined communication intervals, and a second communication state in which a predetermined light emitting apparatus of the plurality of light emitting apparatuses and the image capturing apparatus perform wireless communication at predetermined communication intervals and the predetermined light emitting apparatus and a light emitting apparatus other than the predetermined light emitting apparatus perform wireless communication at variable communication intervals, wherein in the switching is performed to switch to the first communication state or the second communication state according to an operational state of the image capturing apparatus.

* * * * *